United States Patent
Janik et al.

(10) Patent No.: US 6,755,308 B2
(45) Date of Patent: *Jun. 29, 2004

(54) FILTER CARTRIDGE WITH GROMMET SPRING

(75) Inventors: Leon P. Janik, Suffield, CT (US); Michael J. Williams, Glastonbury, CT (US)

(73) Assignee: Stanadyne Corporation, Windsor, CT (US)

( * ) Notice: Subject to any disclaimer, the term of this patent is extended or adjusted under 35 U.S.C. 154(b) by 45 days.

This patent is subject to a terminal disclaimer.

(21) Appl. No.: 10/078,033

(22) Filed: Feb. 19, 2002

(65) Prior Publication Data

US 2002/0113005 A1 Aug. 22, 2002

Related U.S. Application Data (63) Continuation-in-part of application No. 09/357,049, filed on Jul. 19, 1999, now Pat. No. 6,364,121.

(51) Int. Cl.$^7$ ................................................. B01D 27/08

(52) U.S. Cl. ........................................ 210/443; 210/450
(58) Field of Search ................................. 210/440, 443, 210/444, 450, DIG. 17; 277/19, 918; 267/153, 292

(56) References Cited

U.S. PATENT DOCUMENTS

| | | | | |
|---|---|---|---|---|
| 3,037,764 A | * | 6/1962 | Paulsen | 267/292 |
| 5,271,836 A | * | 12/1993 | Janik et al. | 210/232 |
| 5,525,226 A | * | 6/1996 | Brown et al. | 277/641 |
| 6,364,121 B1 | * | 4/2002 | Janik et al. | 210/438 |

FOREIGN PATENT DOCUMENTS

GB           1296051 A   *  11/1972   ................. 210/444

* cited by examiner

*Primary Examiner*—Matthew O. Savage
(74) *Attorney, Agent, or Firm*—Alix, Yale & Ristas, LLP (57) ABSTRACT

A filter cartridge for use with a base to create a filter assembly. The filter cartridge includes a seal to establish a fluid flow within the filter assembly and a resilient bias member to bias the filter cartridge away from the base. The resilient bias member in cooperation with a fastening mechanism secures the filter cartridge to the base.

15 Claims, 11 Drawing Sheets

FILTER CARTRIDGE WITH GROMMET SPRING

CROSS-REFERENCE TO RELATED APPLICATION

This application is a continuation in part of U.S. application Ser. No. 09/357,049, filed Jul. 19, 1999, now U.S. Pat. No. 6,364,121.

BACKGROUND OF THE INVENTION

1. Field of the Invention

This invention relates generally to fluid filters employed in connection with internal combustion engines. More particularly, the present invention relates to fuel filters and lubricating oil filters having a replaceable cartridge for removing foreign particles and/or separating water from the fuel supply or oil system of an internal combustion engine.

2. Description of the Related Art

Conventionally, fuel filters employ a disposable filter cartridge which is replaced at pre-established intervals of filter usage. The filter cartridge is removably installed to a filter base or header. While a number of different methods and structures may be used to join the filter cartridge to the base, all of the methods and structures require general alignment of a filter cartridge axis with a base axis. Filter assemblies to which the invention relates may be mounted in locations where access is limited. It has therefore been the practice to provide these frequently serviced assemblies with securement means that do not require the use of tools. For some filter assemblies to which the invention relates a retaining collar or ring is employed to facilitate the securement function. A resilient bias between the base, filter cartridge and/or retaining collar is required to secure the cartridge to the base such that the cartridge/base relationship resists vibration and shock prevalent in the automotive environment. The axial resilient bias is associated with a reduced torque on the securement means to allow removal of the installed filter cartridge from the base by hand.

Typically, a metallic spring is disposed between the base and filter cartridge or engaged against the retaining collar to provide the required resilient biasing. The spring can be relatively complex. For example, U.S. Pat. No. 5,203,994 discloses a three-dimensional star shaped spring disposed between the base and filter cartridge. U.S. Pat. No. 5,302,284 discloses a wave spring disposed between the filter cartridge and retaining collar. The use of a separate metallic spring represents cost and complexity to the filter assembly, both for the manufacture of the spring as well as for its installation onto the base. Further, these springs break down over time and may be lost or omitted by service personnel, reducing their effectiveness.

SUMMARY OF THE INVENTION

Briefly stated, the invention in a preferred form is a filter cartridge incorporating a novel multi-function grommet spring which both provides an axial biasing force for securement purposes and a sealing function for fluidly sealing the filter cartridge with a base.

The base is of a type having an inlet and an outlet fluidly connected to the engine fuel system. A replaceable filter cartridge is mountable to the base. The replaceable cartridge includes a generally cylindrical housing that houses the fuel filter elements. The top surface of the cartridge defines a circular opening for receiving a fluid flow from the base and for discharging a filtered fluid flow to the base. A grommet spring is mounted to the top surface coaxially around the opening. One end of the grommet spring preferably projects substantially orthogonally from the top surface of the cartridge to form a resilient annular contact surface. The opposing end of the grommet spring is enclosed within the filter cartridge and defines a circular seal portion with a radially inwardly facing seal lip.

When the filter cartridge is secured to the filter base, the seal lip circumferentially contacts a fluid conduit projecting from the base to establish the fluid circuit between the filter cartridge and filter base. In addition, the projecting contact surface is compressed between the filter base and top surface of the cartridge, resiliently biasing the filter cartridge away from the filter base.

An object of the invention is to provide a new and improved disposable filter cartridge.

Another object of the invention is to provide a fuel cartridge biasing structure that is efficient, cost effective and reliable.

A further object of the invention is to provide a new and improved filter cartridge comprising an improved biasing structure for releasably biasing the cartridge to secure installed position in a fuel filter assembly.

Other objects and advantages of the invention will become apparent from the specification and the drawings.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF A PREFERRED EMBODIMENT

Figure 1:
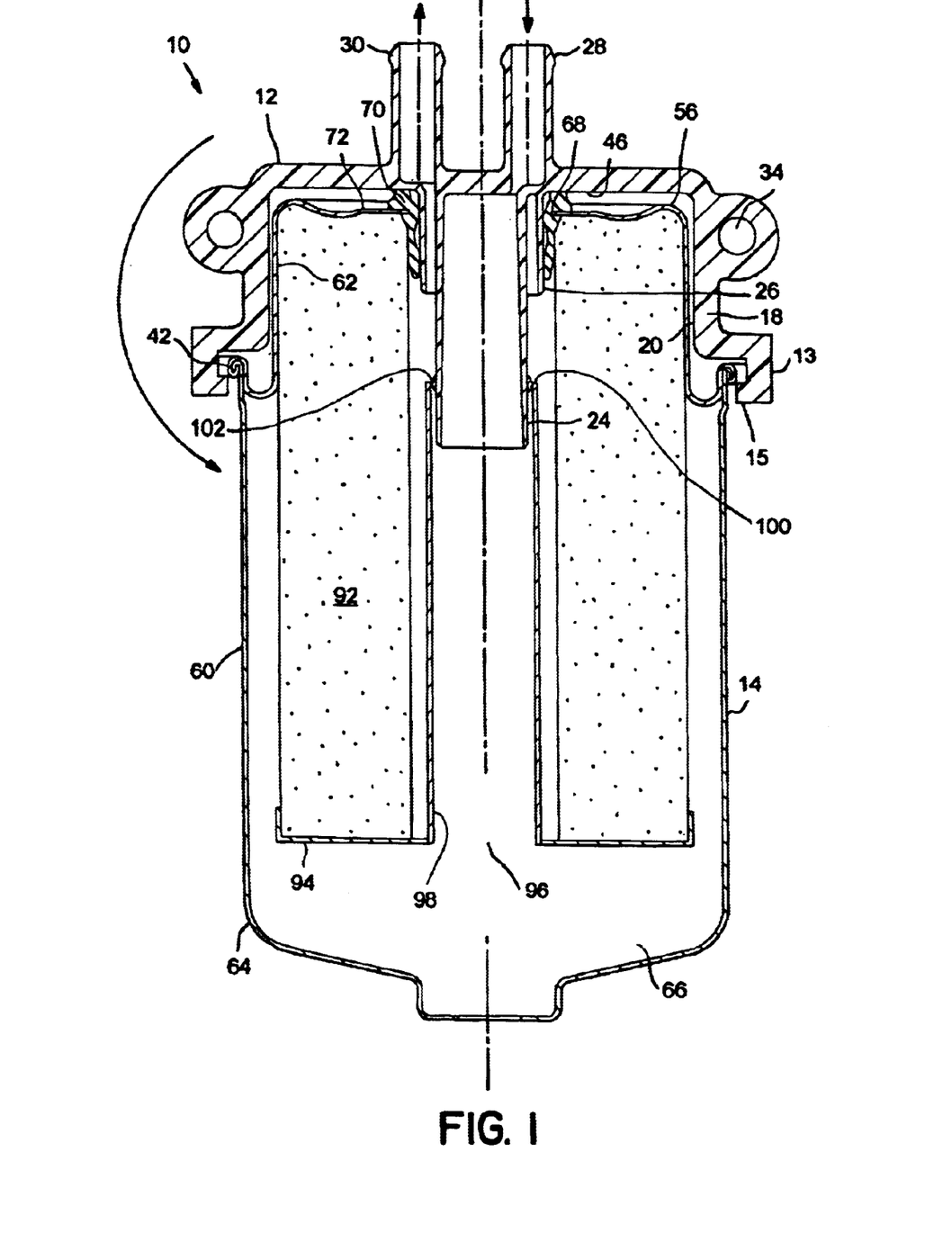
FIG. 1 is a sectional elevational view of a fuel filter assembly in accordance with an embodiment of the invention.

With reference to the drawings wherein like numerals represent like parts throughout the several figures, a preferred filter assembly in accordance with the present invention is generally designated by the numeral 10. As shown in FIG. 1, the filter assembly 10 comprises a base 12 and a disposable filter cartridge 14. The base 12 is generally disposed above the disposable filter cartridge 14. Alternatively, the base 12 and filter cartridge 14 may be inverted, wherein the filter cartridge 14 is disposed above the base 12. In either alternative, the filter cartridge 14 must be physically secured to the base 12 and in fluid communication to create the filter assembly 10. The filter assembly 10 is especially adapted for incorporation into the fuel supply system of an internal combustion engine (not illustrated), such as a diesel engine, for removing particulate matter from fuel and separating water from the fuel. Filter assemblies of this type may also be used to filter impurities from oil in the lubricating system of an internal combustion engine.

The base 12 and the disposable cartridge 14 may assume a wide variety of configurations. For one disclosed embodiment, the base 12 is an inverted cup-like receptacle which forms a skirt 18 defining a lower receptacle cavity 20 for receiving an upper portion of the disposable filter cartridge 14. An inner, elongated, sleeve-like first conduit 24 and an outer, concentric, sleeve-like second conduit 26 provide generally co-axial fluid communication between the base 12 and the disposable filter cartridge 14. The illustrated base 12 includes a retaining structure 13 formed as an integral extension of the skirt 18. The illustrated cartridge 14 is of the type having radially projecting retention tabs 43 formed in the roll seam 42 that joins the upper and lower shell sections of the filter housing 62, 64.

Figure 1A:
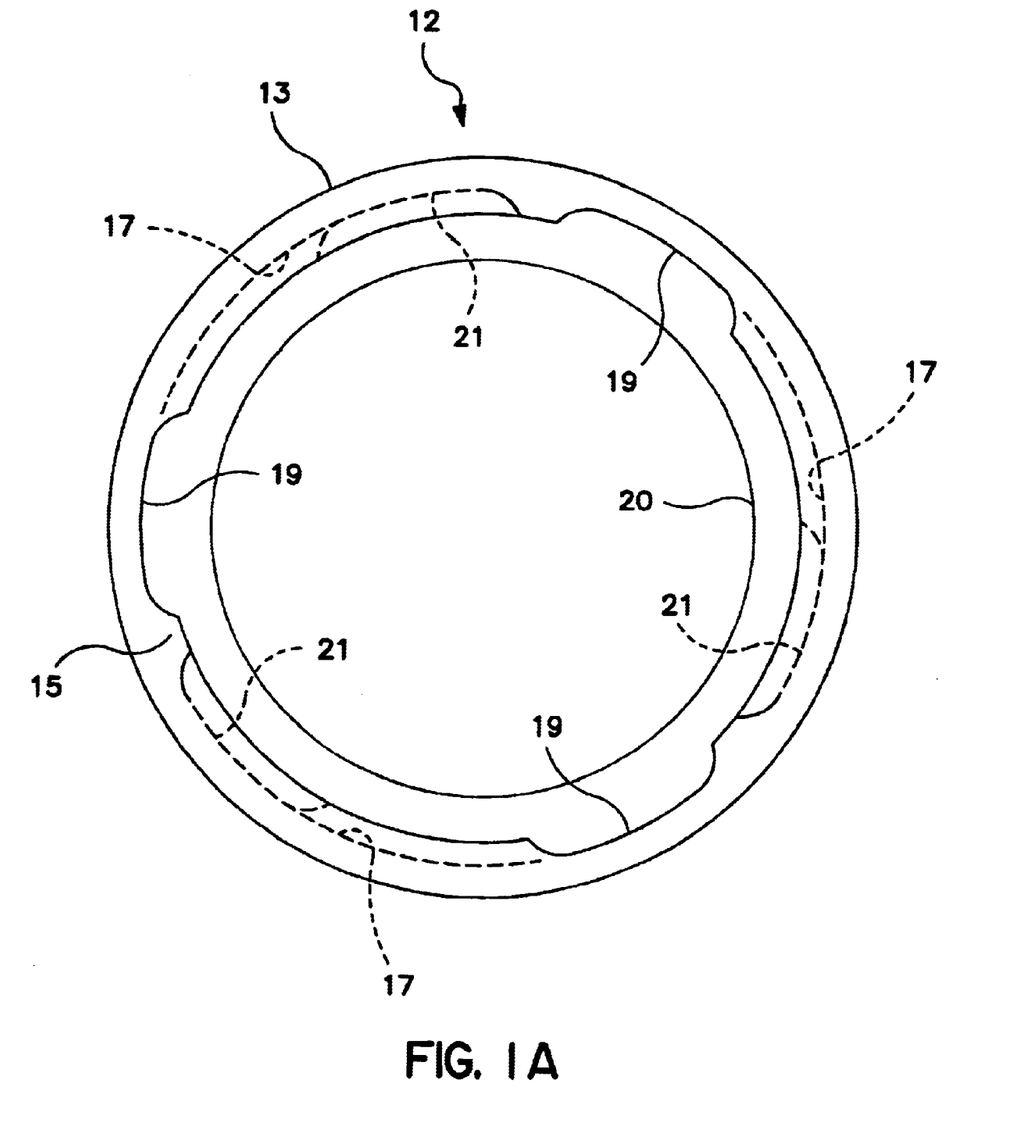
FIG. 1A is a simplified schematic bottom view of the filter base portion of the filter assembly of FIG. 1.

FIG. 1A is a bottom view of the filter base 12 of FIG. 1 showing details of the configuration of the retaining structure 13. The retaining structure has an inwardly extending lip 15 that defines an inward circumferential retention channel 17. The lip 15 defines axial slots 19 that are complementary with and are positioned so that the retention tabs upon alignment and axial insertion, may be closely received therein.

The filter cartridge may be retained to the base by axially aligning the tabs 43 with the slots 19 and upwardly displacing the cartridge 12 into the receiving receptacle 20 of the base 12. The cartridge 14 is then rotated so that the tabs 43 angularly traverse the channel 17 and ride a retention shoulder defined by an upper surface of the lip 15 to a corresponding seat 21 shown in phantom in FIG. 1A. The seat 21 may have a greater axial distance from the base planar surface 46 than the retention shoulder (upper surface of lip 15). The axial force produced by the grommet spring 70 biases the tabs 43 toward the upper surface of the lip 15 to retain the tabs in their seats 21 against counter-rotation and release from the base.

The filter assembly 10 illustrated in FIGS. 1 and 1A permits hand installation of the cartridge 14 in the base 12. Experimentation has revealed that a grommet spring that produces an installed axial biasing force of below approximately 20 pounds will not retain the cartridge 14 to the base with sufficient security to resist the vibrations and shock present in the truck/automotive environment. On the other hand, a filter cartridge equipped with a grommet spring that produces an installed axial biasing force of greater than approximately 60 pounds cannot be installed by hand, e.g., without the assistance of a tool. Therefore, a grommet spring in accordance with the present invention must reliably produce an axial biasing force after installation of between 20 and 60 pounds.

An inlet connector 28 of the base 12 connects with the engine fuel line (not illustrated) to ultimately provide fluid communication through the interior passageway defined by the first conduit 24. An outlet connector 30 of the base 12 connects with the fuel line to provide external fluid communication from the axial fluid passageway defined between the first and second conduits 24, 26. A pair of openings 34 for anchoring the filter base 12 to the engine, extend transversely from the base 12.

With reference to FIG. 1, a base planar surface 46 is positioned within the receptacle cavity 20 and radially extends from the conduits 24, 26. Preferably the base planar surface 46 extends from the conduits 24, 26 to the skirt 18, although the planar surface may also terminate at a point intermediate the conduits and skirt. A resilient axial bias force is exerted by the grommet spring 70 that is compressed against the planar surface 46. The resilient axial bias force in cooperation with the tab/retaining structure described above releasably secure the cartridge 14 and base 12 together to form the filter assembly 10.

The disposable filter cartridge 14 comprises a can-like housing 60 formed by a pair of opposed lower and upper cup-like sections 64, 62, respectively. The sections 62, 64 are joined along a circumferential roll seam 42. A sump 66 is formed at the bottom of the lower section 64 to collect any water that coalesces from the fuel. The lower section 64 may incorporate a selectively actuatable valve or draincock (not shown) to permit draining of the collected water.

The upper section 62 is smaller in diameter than the lower section 64 and is dimensioned to be closely accommodated within the base cavity 20. Preferably, the top portion 72 of the upper section 62 of the filter cartridge housing 60 has a longitudinally upward bend configuration that forms an annular ridge 56. Also, the ridge 56 is preferably disposed along the circumference of the top portion 72. The annular ridge 56 adds strength to the filter cartridge and may also act as an axial stop, e.g., a limit to the axial compression of the grommet spring 70. A central axial opening 68 in the top portion 72 of the upper section 62 is dimensioned to receive the conduits 24, 26. A grommet spring 70 is mounted at the opening 68.

Figure 6:
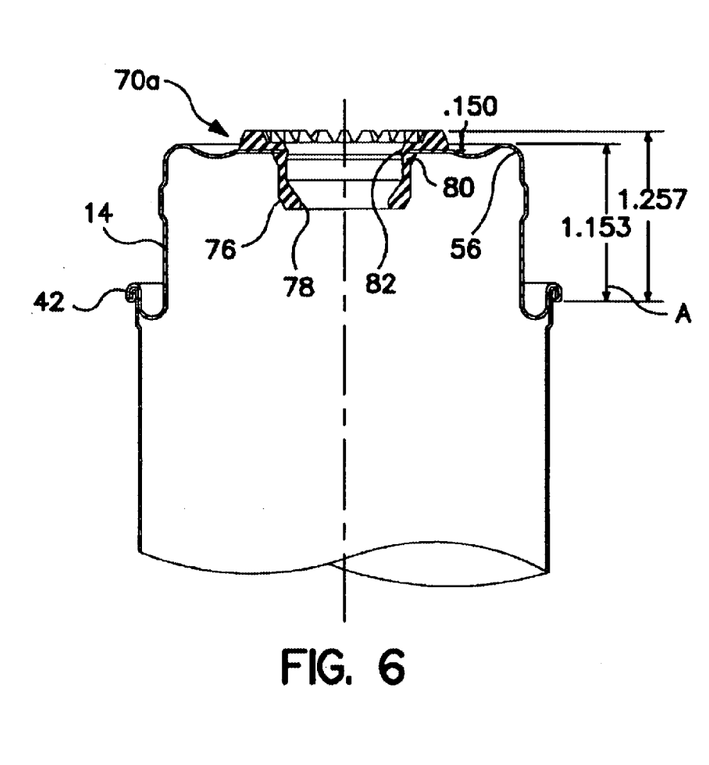
FIG. 6 is a sectional view, partly broken away, of a filter cartridge illustrating an alternative grommet spring in accordance with the present invention.
Figure 7:
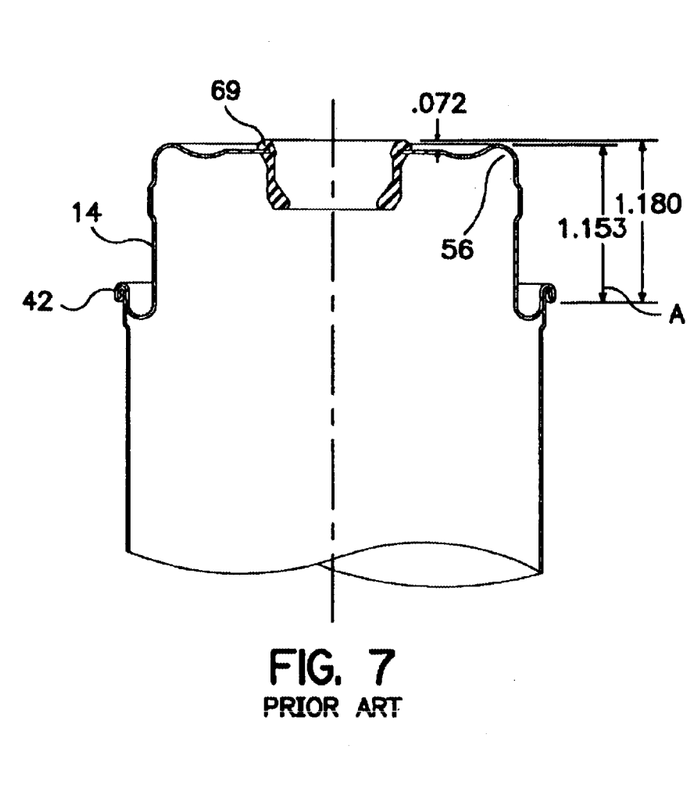
FIG. 7 is a sectional view, partly broken away, of a prior art filter cartridge illustrating a prior art sealing grommet.

FIG. 6 illustrates a filter cartridge 14 equipped with an alternative grommet spring 70a in accordance with the present invention. FIG. 7 illustrates a prior art filter cartridge 14 equipped with a non-spring grommet 69. The filter cartridge housings have identical proportions between the roll seam 42 and the annular ridge 56, i.e., and axial distance A of 1.153 inches. This dimension is the shortest possible axial distance between the upper surface of the inward projecting lip 15 and the base planar surface 46. The prior art non-spring grommet 69 has a total axial height above the cartridge upper surface 72 of 0.072 inches and projects above the annular ridge an axial distance of 0.027 inches. In contrast, the illustrated grommet spring 70a projects has a total axial height above the cartridge upper surface 72 of 0.150 inches and projects above the annular ridge 56 an axial distance of 0.104 inches.

As previously discussed, to function properly, a grommet spring in accordance with the present invention must produce an installed axial biasing force of between 20 and 60 pounds. As with any spring material, the grommet spring will produce a range of axial biasing forces depending upon how far the grommet spring is compressed, e.g., small axial compression results in small axial biasing force and large axial compression results in large axial biasing force. In the context of the present invention, the biasing force produced by the grommet spring must be within the range of 20 to 60 pounds, after installation. This range of forces will produce a corresponding range of deflection (axial compression) of the grommet spring with the deflection produced being dependent upon the properties of the spring material and the configuration of the grommet spring.

Another factor influencing the relationship between the base 12, cartridge 14 and grommet spring 70 are manufacturing tolerances. Each part in the filter assembly 10 has a variation in its finished proportions depending on numerous material, environmental and manufacturing variables. Therefore, each part in the assembly must be expected to vary in its dimensions within a pre-determined range. An assembly must be designed such that the accumulated tolerances of the component parts will not interfere with proper functioning of the assembly. In the instant case, a grommet spring must be configured to produce between 20 and 60 pounds of installed axial biasing force over a range of deflection that is sufficient to accommodate the manufacturing tolerances of the component parts, including the grommet spring itself.

Figure 8:
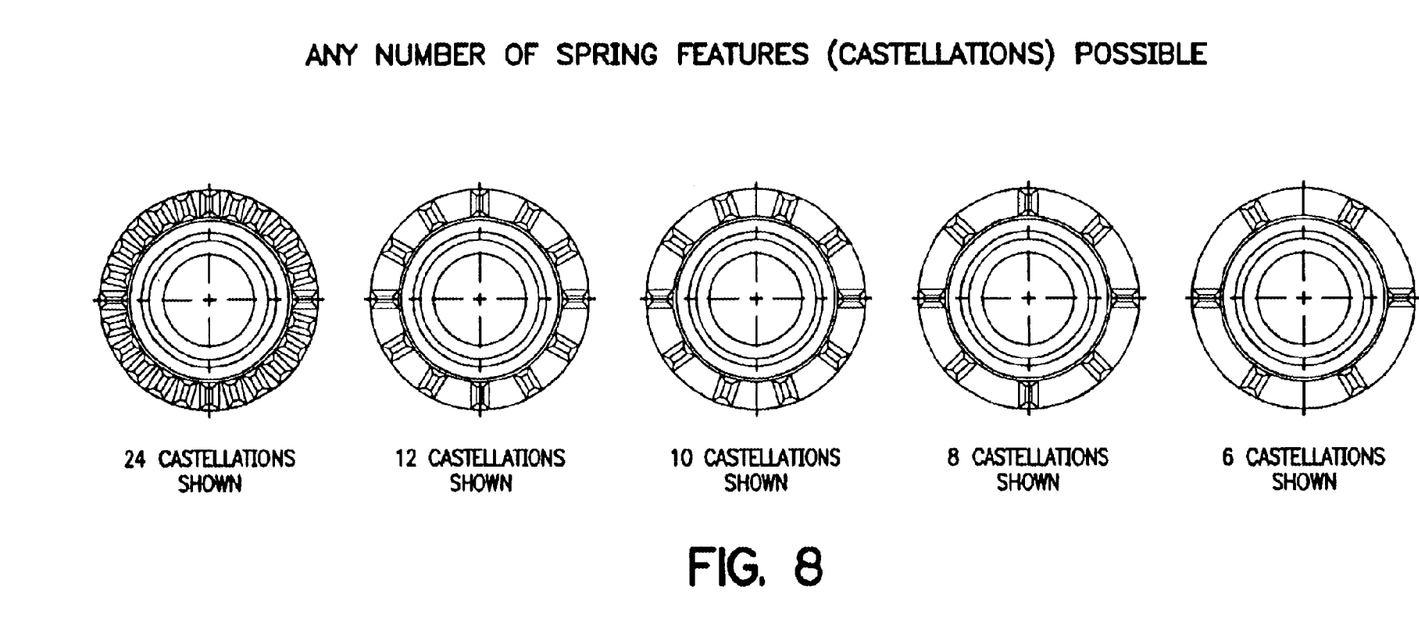
FIG. 8 illustrates five alternative configurations for a grommet spring in accordance with the present invention.
Figure 9:
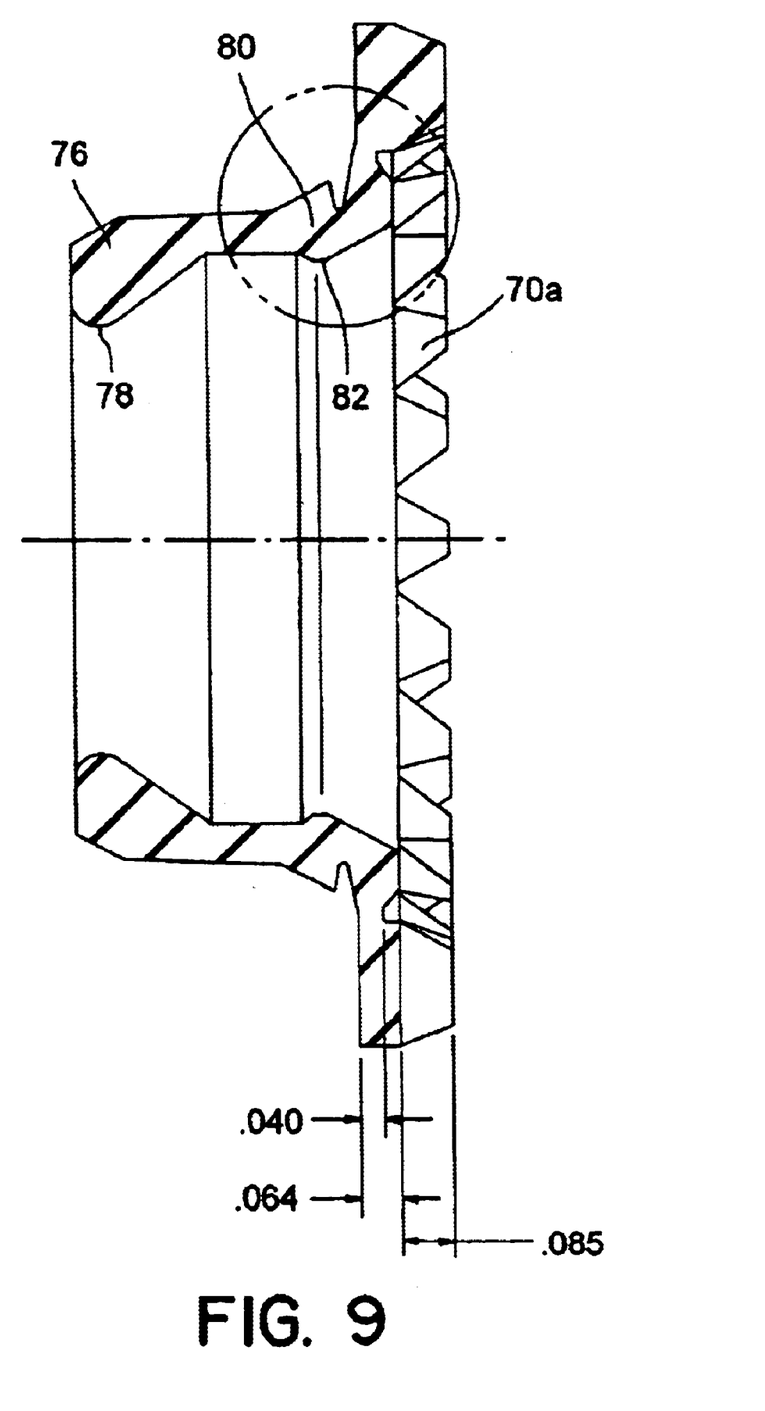
FIG. 9 is an enlarged sectional view of the grommet spring of FIGS. 6 and 10.
Figure 10:
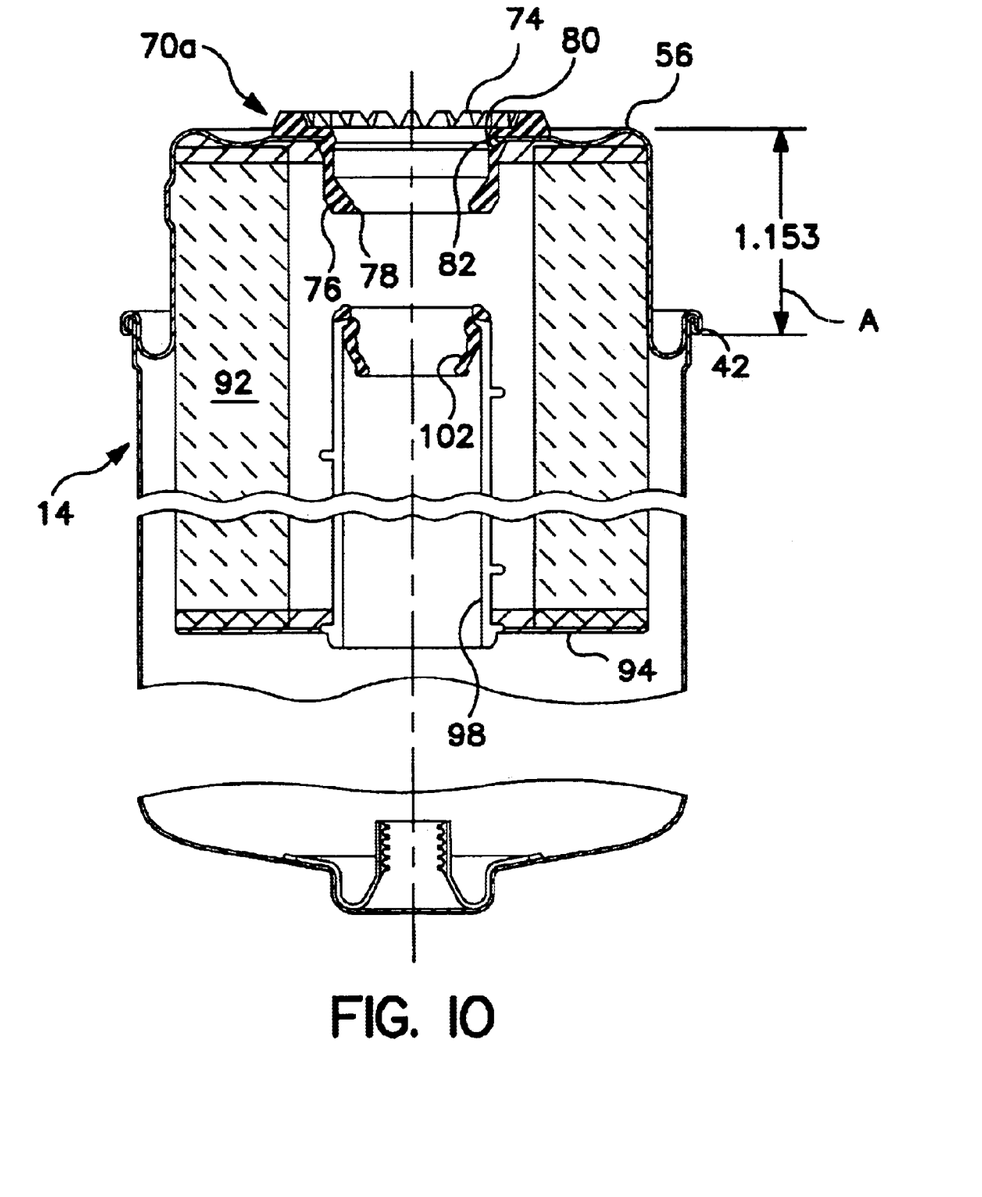
FIG. 10 is a sectional view, partly broken away, through a filter cartridge and element equipped with the grommet spring of FIG. 6 in accordance with the present invention.
Figure 11:
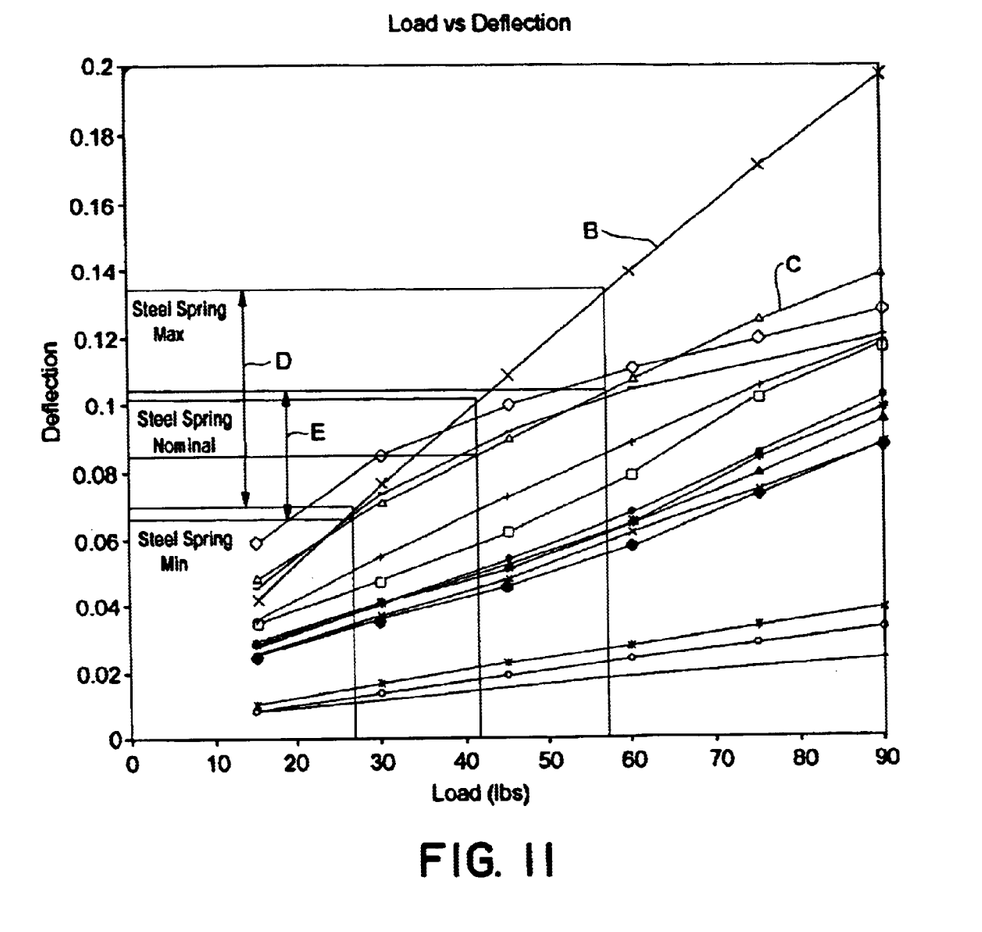
FIG. 11 is a graph contrasting a load vs. deflection curve for a grommet spring in accordance with the present invention with the load vs. deflection curve of a prior art steel spring.
Figure 12:
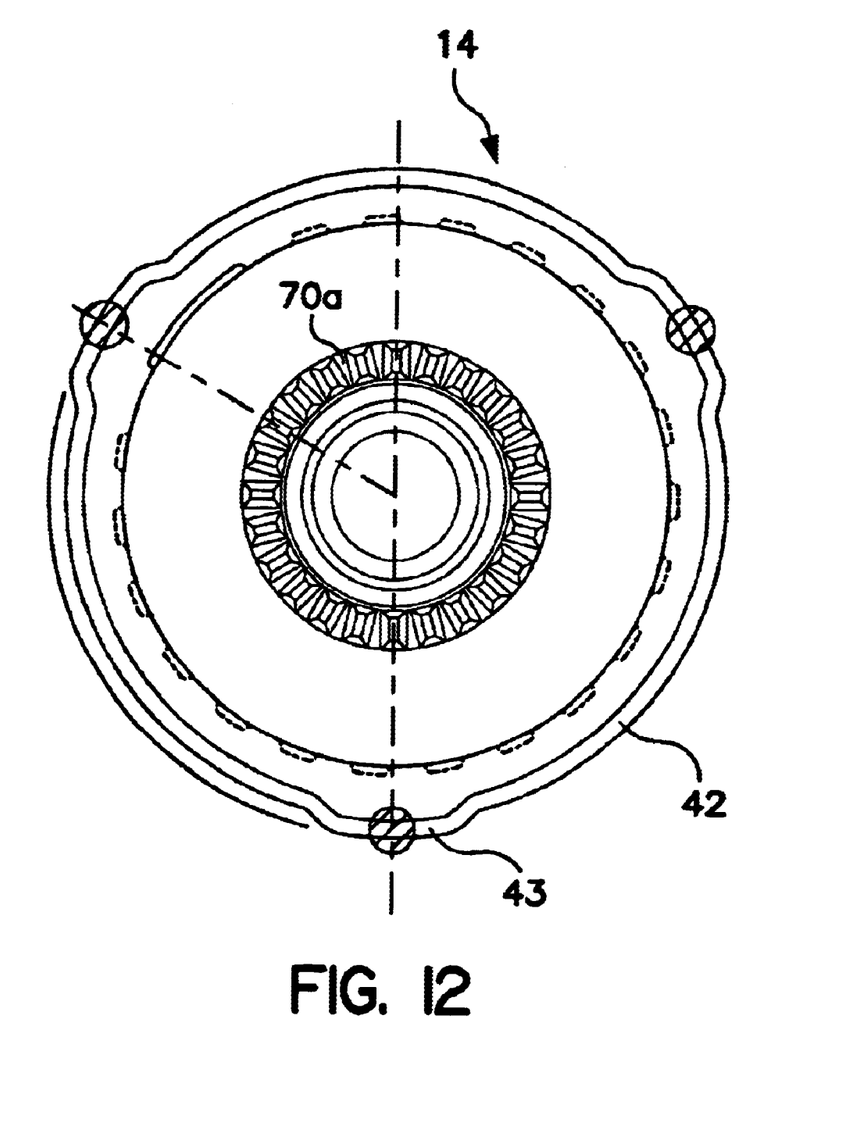
FIG. 12 is a top view of the filter cartridge of FIG. 10.

FIG. 8 illustrates several variations of the grommet spring 70a illustrated in FIGS. 6, 10 and 12. The grommet spring is illustrated with 24, 12, 10, 8 and 6 castellations (elastomeric spring columns). It will be understood that each of these variations will have a different load vs. deflection curve. FIG. 11 illustrates the load vs. deflection curves for a number of different spring configurations. Curve B is the load vs. deflection curve of a prior art steel spring. Curve C is the load vs. deflection curve of an inventive grommet spring with eight (8) castellations as illustrated in FIG. 8. The horizontal axis measures load in pounds (lbs) and should be understood to represent installed axial biasing force as previously discussed. The vertical axis measures the deflection of the particular spring device in inches.

For the purposes of discussing FIG. 11, the acceptable range of loads (installed axial biasing forces) is between 28 and 58 pounds. Curve B shows that the steel spring deflects in a linear fashion from a minimum of 0.07 inches at 28 pounds to a maximum of 0.135 inches at 58 pounds with a nominal deflection of 0.101 inches at a nominal force of approximately 41 pounds. The steel spring range of deflection D is 0.065 inches. This means that the steel spring can accommodate an accumulated component tolerance of + or −0.0325 inches and still produce an axial biasing force within the acceptable range.

Curve C shows that a grommet spring having eight castellations will deflect in a less linear fashion from a minimum of 0.065 inches at 28 pounds to a maximum of 0.104 inches at 58 pounds with a nominal deflection of 0.085 inches at approximately 41 pounds. The eight castellation grommet spring has a range of deflection E of 0.038 inches. This means that the eight castellation grommet spring can accommodate an accumulated component tolerance of + or − 0.019 inches. It can be seen that the eight castellation grommet spring can accommodate significantly less accumulated component tolerance than the prior art steel spring.

Those of skill in the manufacturing arts will understand that there is a practical lower limit to manufacturing tolerances. It should also be apparent from the above discussion that the prior art non-spring grommet illustrated in FIG. 7 will have insufficient axial deflection available to produce the required biasing force. Additionally, the extremely small total axial deflection available will be inadequate to accommodate the expected accumulated component tolerances. This is why the prior art cartridge and non-spring grommet were typically associated with a separate metal biasing spring to produce the necessary installed axial biasing force. The inventive grommet spring eliminates the need for a separate biasing spring while accommodating an acceptable accumulated component tolerance.

Figure 2:
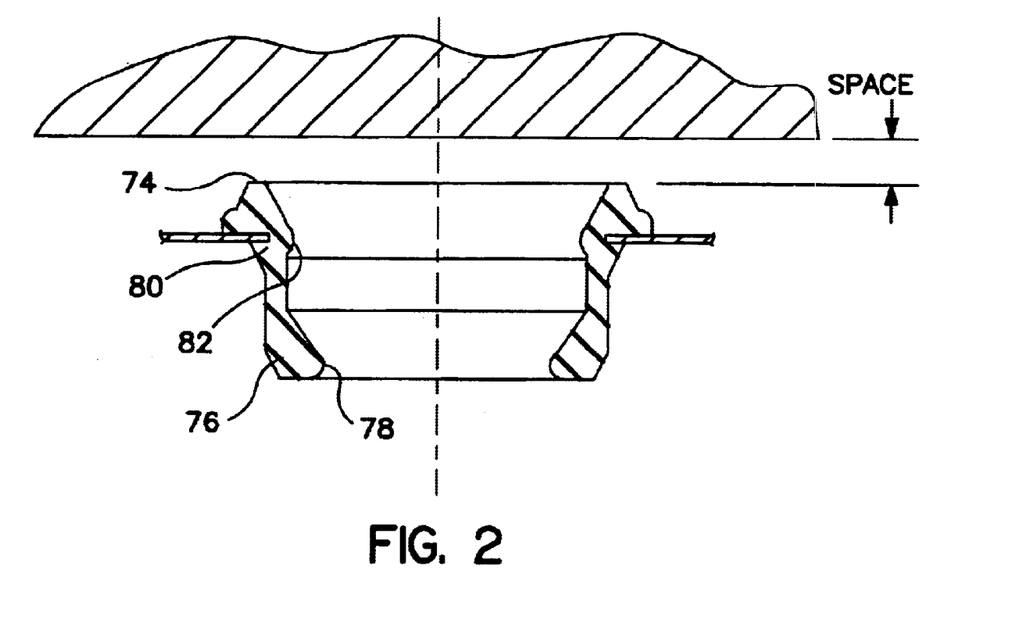
FIG. 2 is an enlarged fragmentary sectional view of an embodiment of the inventive grommet spring of the filter cartridge of FIG. 1 prior to contact with a filter base.
Figure 3:
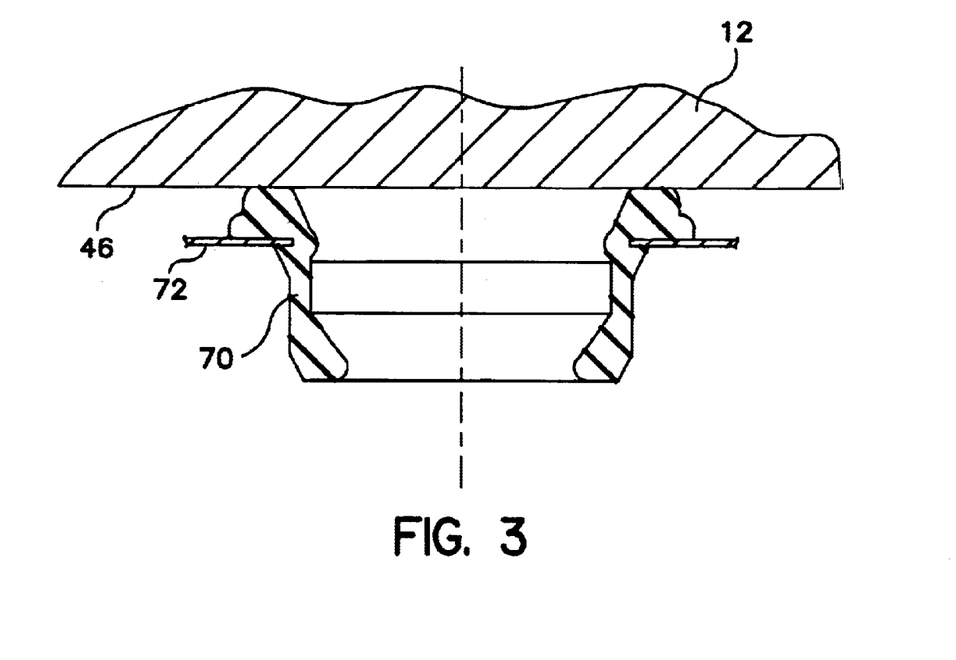
FIG. 3 is a view similar to FIG. 2 showing the filter cartridge secured to the filter base and the grommet spring compressed therebetween.
Figure 4A:
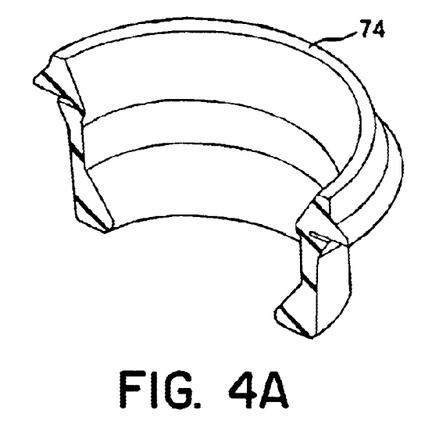
FIGS. 4a, 4b and 4c are fragmentary perspective views, partially in section, of grommet spring embodiments illustrating variations of the biasing structure.

The grommet spring 70 includes a contact surface 74 axially projecting away from the top portion 72. Preferably, the contact surface is annular as shown in FIG. 4a. The annular contact surface 74 contacts the base planar surface 46 and is compressed between the planar surface 46 and the filter cartridge top portion 72, when the filter cartridge 14 is secured to the filter base 12 as illustrated in FIGS. 2 and 3. The compression results in a radial expansion of the contact surface 74 where it contacts the base planar surface 46.

Naturally, while in the preferred embodiment the grommet spring 70 comprises the annular contact surface 74, it is also be possible to resiliently bias the filter cartridge 14 with a separate bias member (not shown) mounted to the top portion 72. The separate bias member would include the contact surface 74 of this embodiment.

Figure 4B:
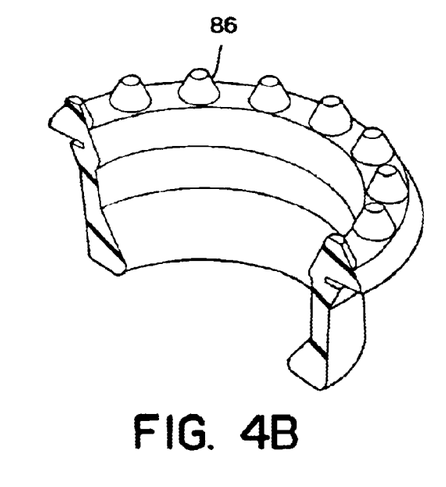
Figure 4C:
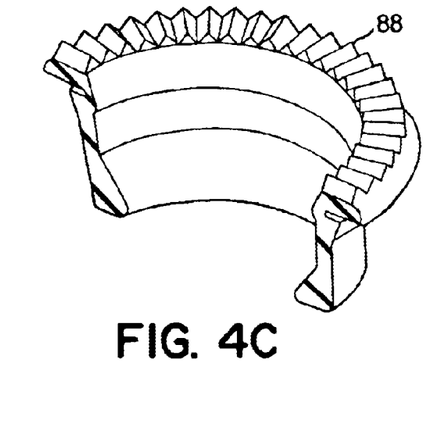

Further, while the axially protruding portion of the grommet spring may be axially tapered to a level contact surface 74 of uniform thickness as shown in FIG. 4a, castellated or other discontinuous non-level contact surfaces are also capable of providing the desired resilient biasing force between the filter base 12 and cartridge 14. As examples, the annular surface 74 may include angularly spaced, axially projecting conical projections 86, prismatic projections 88 or combinations thereof. See FIGS. 4b and 4c. FIGS. 6, 8, 10 and 12 illustrate related alternative embodiments of the grommet spring in which the contact surface 74 is in the form of the flat tops of a plurality of pyramid-shaped spring columns or castellations. By varying the number and configuration of these castellations (as illustrated in FIG. 8) it is possible to alter the load vs. deflection curve to suit design and manufacturing requirements.

The contact surface 74, and preferably the complete grommet spring 70, 70a, is molded from a polymeric material. The polymeric material must provide a desired combination of moldability, chemical resistance and adequate resiliency to releasably maintain the filter assembly 10 in the fluidly coupled secured state in conjunction with a fastening mechanism. Preferably, the polymer material has a Shore "A" durometer hardness within the range of 55–75, with a preferred hardness being 65. The polymer material is also preferably sufficiently resilient to permit a displacement of up to 0.104 inches and preferably approximately 0.085 inches between the axially extended position and the axially compressed position of the axially protruding portion of the grommet spring 70, 70a. The axial compression of the axially protruding portion of the grommet spring is at least approximately 44% for minimal loading, at least approximately 69% for maximum loading and approximately 56% for normal loading between the cartridge and the base. Polymeric materials, such as, for example, Buna N (nitrile) Rubber, VITON (available from DuPont) and fluorosilicone have been found to provide the desired properties when formed into a grommet spring 70, 70a.

As shown best in FIGS. 2, 6, 9 and 10, the opposing end of the grommet spring 70, 70a comprises a circular first seal portion 76 for the filter cartridge 14. The first seal portion 76 includes a radially inwardly facing seal lip 78 which diametrically seals against the outer conduit 26 when the filter cartridge 14 is secured to the filter base 12. Preferably, the grommet spring 70, 70a further includes a second seal portion 80 disposed intermediate the contact surface 74 and first seal portion 76. The second seal portion 80 includes a radially inwardly facing second seal lip 82. The first seal portion 76 is radially inwardly biased so that when the filter cartridge 14 is separated from the filter base 12 the first and second seal lips 78, 82, respectively, have different diameters. When the filter cartridge 14 is secured to the filter base 12 such that the first and second seal lips 78, 82 are sealingly engaged with the outer conduit 26, the diameters of the seal lips 78, 82 are substantially the same as shown in FIG. 1.

The cartridge 14 may employ a dual stage filter assembly (not shown) or a single stage filter assembly as illustrated in FIGS. 1 and 10. In the single stage filter assembly, a filter element 92, which may have a continuous fan-shaped pleated configuration, is mounted in the enclosure 60. The lower end of the element 92 is engaged by a medial plate 94 having a central opening 96. A tubular conduit 98 extends upward from the medial plate 94. The tubular conduit 98 upper end defines a flange 100. A sealing grommet 102 mounted to the flange 100 receives and diametrically seals against the lower end of the base first conduit 24.

Fuel enters the fuel filter assembly 10 through the fuel inlet passage 28 and exits the filter through the outlet passage 30. It will be appreciated that the fuel flow path initially axially traverses through the interior of the inner conduit 24 and tubular conduit 98. The circulation path curves around the medial plate 94 and extends generally axially upwardly and generally radially inwardly through the filter element 92 with the return flow path traversing between the inner conduit 24 and the outer conduit 26 into the outlet passage 30.

Figure 5:
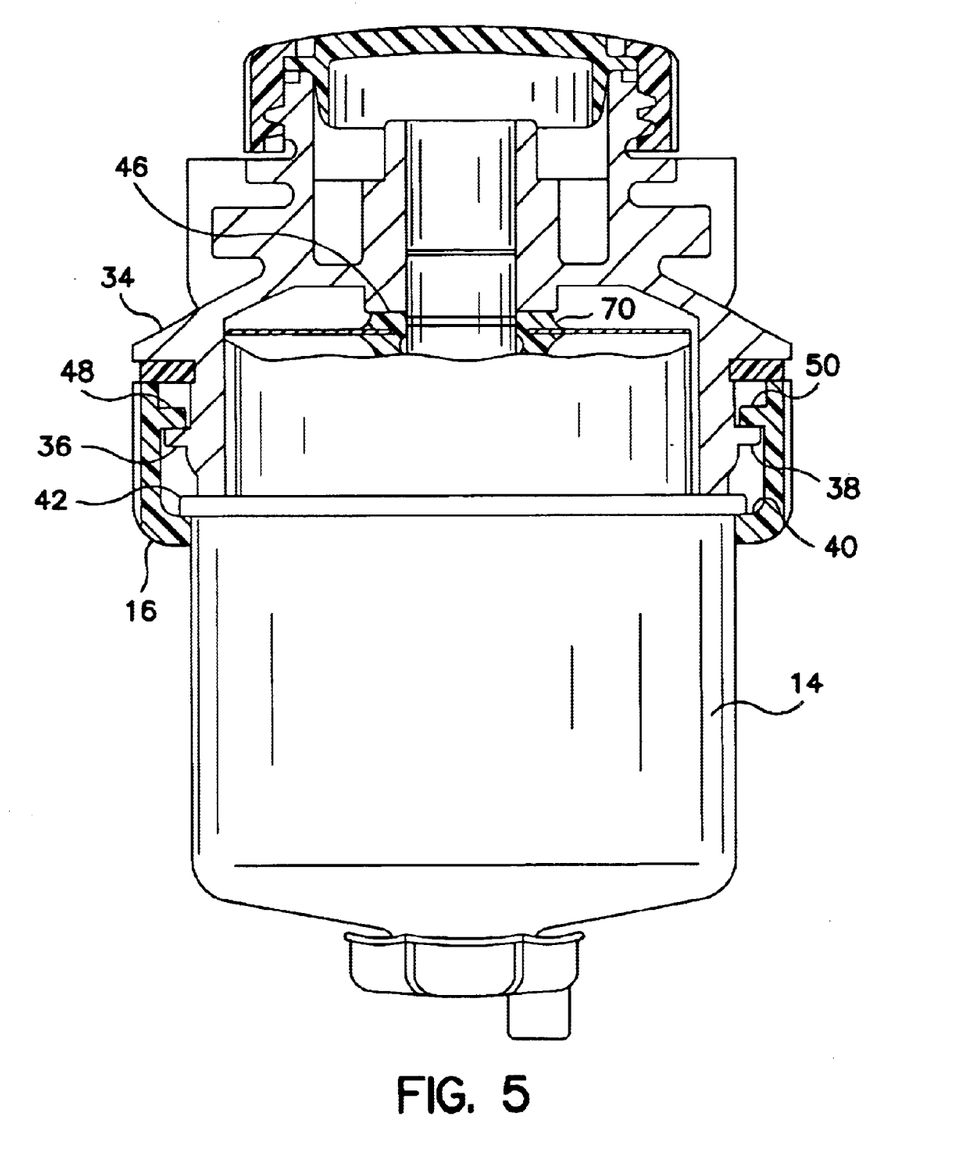
FIG. 5 is a sectional view, partly broken away, of a fuel filter assembly illustrating a cartridge fastening mechanism.

A fastening mechanism acts in concert with the bias force exerted by the contact surface 74 against the base planar surface 46 to secure the filter cartridge 14 to the base 12. An alternative fastening mechanism to that described with reference to FIGS. 1 and 1A is shown in FIG. 5, wherein a base 34 includes a pair of integral outwardly projecting diametrically opposed ramps 36, 38 which ascend in spiral-like fashion around the base 34. The upper ends of the ramps 36, 38 are beveled. An annular collar 16 includes a pair of diametrically disposed spiral followers 48, 50 that integrally extend inwardly from the collar 16. The followers 48, 50 are dimensioned and positioned for engagement with the ramps 36, 38 so that the followers 48, 50 slidably engage and ascend the ramps 36, 38 upon alignment and angular rotation of the collar 16. The collar 16 includes an inwardly projecting annular shoulder 40 which may engage the roll seam 42 of the cartridge 14 for releasably securing the cartridge 14 to the base 34 in cooperation with the contact surface 74. It will be understood that the installed axial bias force limitations for the fastening mechanism of FIG. 5 may be different from those discussed with respect to the fastening mechanism illustrated in FIGS. 1 and 1A. One goal of the invention is to provide a filter cartridge fastening mechanism that meets all relevant service requirements and does not require the assistance of a tool for installation or removal of the cartridge 14.

While detailed structures for a mechanism to releasably fasten the filter cartridge 14 to the base 12, 34 have been set forth for purposes of illustration, it should be understood that the inventive filter cartridge and grommet spring is not limited to this described structures and can find application in filter assemblies using different filter cartridge fastening mechanisms.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A filter cartridge comprising:
    an upper shell portion having a first diameter and an upper surface defining an axial opening;
    a lower shell portion having a second diameter and connected to said upper shell portion by a peripheral roll seam;
    a filter element secured within the connected upper and lower shell portions;
    cartridge seal means for sealing said cartridge to a conduit received through said axial opening in said upper surface; and
    an elastomeric spring axially protruding from said upper surface an axial distance of at least one tenth (0.1) of an inch,
    wherein said cartridge seal means and said elastomeric spring comprise a unitary molded component.

2. The filter cartridge of claim 1, wherein said elastomeric spring is comprised of a polymer.

3. The filter cartridge of claim 2, wherein said polymer is selected from the group consisting of Buna N (nitrile) Rubber or fluorosilicone.

4. The filter cartridge of claim 2, wherein said polymer has a Shore "A" durometer hardness of between 55 and 75.

5. The filter cartridge of claim 1, wherein said elastomeric spring terminates in an axially projecting contact surface.

6. The filter cartridge of claim 1, wherein said elastomeric spring comprises a plurality of spring columns arranged around the axial opening in said upper surface.

7. The filter cartridge of claim 6, wherein said plurality of spring columns comprises between 6 and 24 spring columns.

8. The filter cartridge of claim 1, wherein said elastomeric spring has a range of deflection of at least one tenth (0.1) of an inch over which said elastomeric spring produces an axial force of between 20 and 60 pounds.

9. A filter cartridge comprising:
    an upper shell portion having a first diameter and an upper surface defining an axial opening;
    a lower shell portion having a second diameter and connected to said upper shell portion to define an interior space;
    a filter element secured in said interior space; cartridge seal means at said axial opening for sealing said cartridge to a conduit received therethrough; and
    a spring consisting essentially of polymer material axially protruding from said upper surface,
    wherein said cartridge seal means and said spring comprise a unitary molded component and said spring has a range of deflection traversing an axial distance of at least one tenth (0.1) of an inch over which said spring produces an axial force of between 20 and 60 pounds.

10. The filter cartridge of claim 9, wherein said spring axially protrudes from said upper surface by a distance of at least one-tenth (0.1) of an inch.

11. The filter cartridge of claim 9, wherein said polymer material is selected from the group consisting of Buna N (nitrile) Rubber, and fluorosilicone.

12. The filter cartridge of claim 9, wherein said spring terminates in an axially projecting contact surface.

13. The filter cartridge of claim 9, wherein said spring comprises a plurality of spring columns arranged around the axial opening in said upper surface.

14. The filter cartridge of claim 13, wherein said plurality of spring columns comprises between 6 and 24 spring columns.

15. The filter cartridge of claim 9, wherein said polymer material has a Shore "A" durometer hardness of between 55 and 75.

* * * * *